(12) United States Patent
Anderson

(10) Patent No.: US 7,419,044 B2
(45) Date of Patent: Sep. 2, 2008

(54) APPARATUS AND METHOD FOR ORIENTING NON-ROUND CONTAINERS

(75) Inventor: William P. Anderson, Toledo, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 11/636,004

(22) Filed: Dec. 8, 2006

(65) Prior Publication Data

US 2008/0135380 A1 Jun. 12, 2008

(51) Int. Cl.
*B65G 47/24* (2006.01)
(52) U.S. Cl. .................................. 198/416; 198/397.04
(58) Field of Classification Search ................. 198/416, 198/397.03–397.05
See application file for complete search history.

(56) References Cited

U.S. PATENT DOCUMENTS

| | | | |
|---|---|---|---|
| 2,928,521 A | | 3/1960 | Johnson |
| 3,216,551 A | | 11/1965 | Peck |
| 3,556,279 A | | 1/1971 | Cotter |
| 3,738,474 A | | 6/1973 | Ellis |
| 3,834,516 A | | 9/1974 | Reeser |
| 4,124,112 A | | 11/1978 | Mohney et al. |
| 4,479,582 A | * | 10/1984 | Ducloux ................... 209/552 |
| 4,653,628 A | | 3/1987 | Claypool et al. |
| 4,779,714 A | * | 10/1988 | Madden ...................... 198/399 |
| 6,502,688 B1 | | 1/2003 | Krooss et al. |
| 6,557,695 B2 | | 5/2003 | Gerber et al. |
| 6,581,751 B1 | | 6/2003 | Nickey et al. |
| 6,808,060 B1 | | 10/2004 | Giometti |

FOREIGN PATENT DOCUMENTS

GB 2077209 A 12/1981

\* cited by examiner

*Primary Examiner*—Mark A Deuble

(57) ABSTRACT

Apparatus for controlling orientation of non-round containers at an outfeed station of a container inspection machine having a rotary conveyor with pockets in which the containers are individually disposed includes a flipper arm disposed adjacent to the conveyor and a spring biasing the flipper arm toward the conveyor. The flipper arm has a cam surface disposed to be engaged by a container carried by the conveyor as the container approaches the outfield station of the conveyor to cam the flipper arm outwardly with respect to the conveyor and against the force of the spring. The flipper arm has an edge adjacent to the cam surface for engaging and rotating the container as the container moves out of engagement with the cam surface and the flipper arm moves inwardly under force of the spring. The flipper arm preferably is mounted to pivot around an axis, and the spring preferably biases the flipper arm around the axis toward the conveyor. The cam surface preferably is concave, and the edge of the flipper arm preferably is at an edge of the cam surface remote from the pivot axis of the flipper arm. The flipper arm preferably also includes an abutment surface extending from the edge of the flipper arm to stabilize the container at the orientation to which the flipper arm rotates the container.

5 Claims, 4 Drawing Sheets

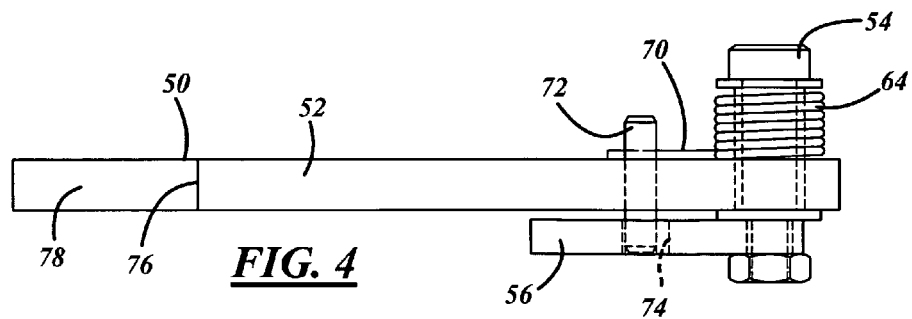
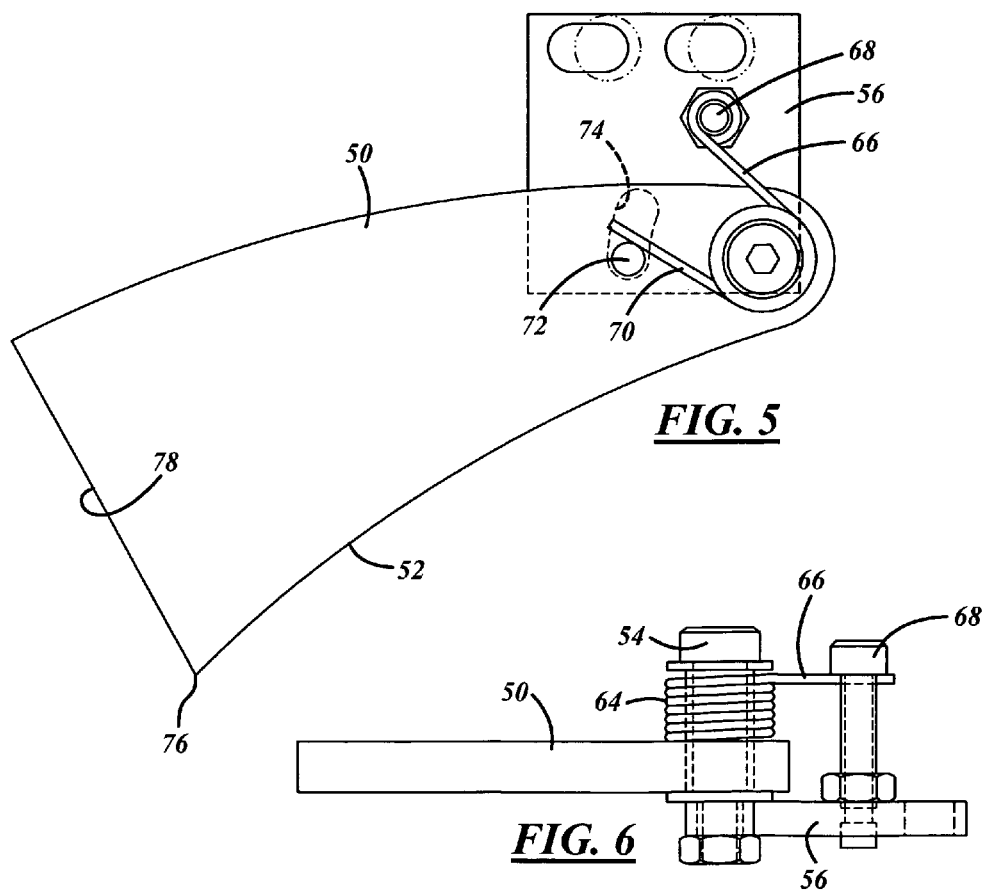

ND METHOD FOR
APPARATUS AND METHOD FOR
ORIENTING NON-ROUND CONTAINERS

The present disclosure relates to orientation of non-round containers in a rotary container inspection machine, and more particularly to an apparatus and method for orienting flask-shaped containers at the outfeed station of a rotary container inspection machine.

BACKGROUND AND SUMMARY OF THE DISCLOSURE

U.S. Pat. Nos. 4,124,112 and 6,557,695 disclose devices for inspecting non-round containers, such as glass containers, for commercial variations that can affect acceptability of the containers. A rotary conveyor transports the containers in sequence from an infeed station through at least one inspection station to an outfeed station at which the containers are transported away from the inspection machine. The rotary conveyor has a plurality of peripheral pockets in which the containers are individually disposed. The machine of U.S. Pat. No. 4,124,112 includes a plurality of flexible resilient fingers disposed upstream of the outfeed station for positioning each container in sequence at a desired orientation at the outfeed station. A general object of the present disclosure is to provide an apparatus for orienting non-round containers, particularly flask-shaped containers, at a desired orientation at the outfeed station of the a rotary container inspection machine.

The present disclosure embodies a number of aspects that can be implemented separately from or in combination with each other.

Apparatus for controlling orientation of non-round containers at an outfeed station of a container inspection machine having a rotary conveyor with pockets in which the containers are individually disposed, in accordance with one aspect of the present disclosure, includes a flipper arm disposed adjacent to the conveyor and a spring biasing the flipper arm toward the conveyor. The flipper arm has a cam surface disposed to be engaged by a container carried by the conveyor as the container approaches the outfeed station of the conveyor to cam the flipper arm outwardly with respect to the conveyor and against the force of the spring. The flipper arm has an edge adjacent to the cam surface for engaging and rotating the container as the container moves out of engagement with the cam surface and the flipper arm moves inwardly under force of the spring. The flipper arm preferably is mounted to pivot around an axis, and the spring preferably biases the flipper arm around the axis toward the conveyor. The cam surface preferably is concave, and the edge of the flipper arm preferably is at an edge of the cam surface remote from the pivot axis of the flipper arm. The flipper arm preferably also includes an abutment surface extending from the edge of the flipper arm to stabilize the container at the orientation to which the flipper arm rotates the container.

BRIEF DESCRIPTION OF THE DRAWINGS

The disclosure, together with additional objects, features, advantages and aspects thereof, will best be understood from the following description, the appended claims and the accompanying drawings, in which:

FIG. 4 is an elevational view of a portion of the apparatus illustrated in FIGS. 1-3;

FIG. 5 is a plan view of the portion of the apparatus illustrated in FIG. 4; and FIG. 6 is a side elevational view of the portion of the apparatus illustrated in FIGS. 4-5.

DETAILED DESCRIPTION OF PREFERRED EMBODIMENTS

Figure 1:
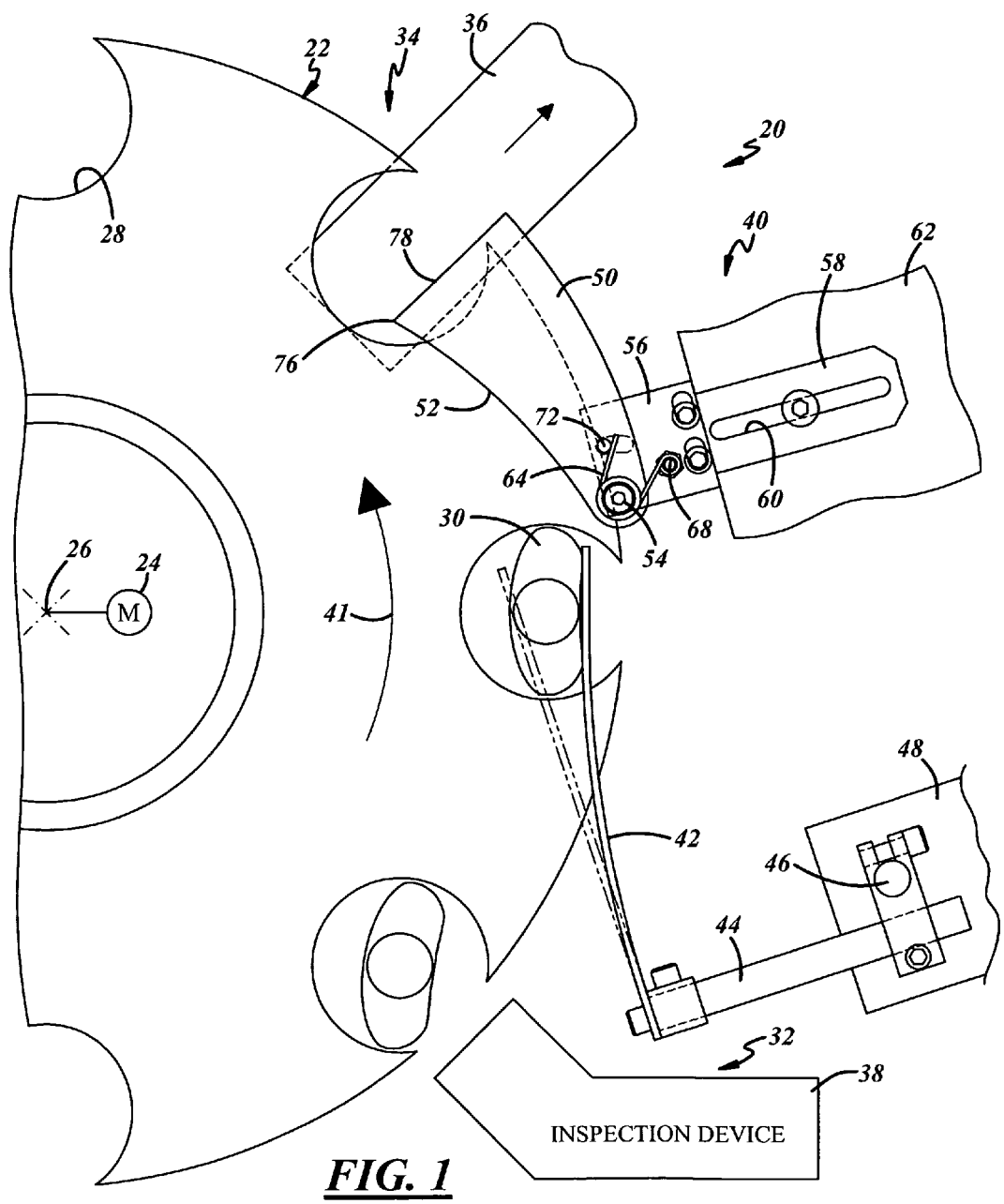
FIG. 1 is a fragmentary schematic plan view of a rotary container inspection machine having a container orientation apparatus in accordance with an exemplary embodiment of the present disclosure.

FIG. 1 illustrates a container inspection machine 20 in accordance with an exemplary embodiment of the present disclosure as including a rotary conveyor 22 driven by a motor 24 to rotate around a conveyor axis 26. Conveyor 22 has a plurality of peripheral pockets 28 in which containers 30 are disposed for transport in sequence from an infeed station to and through at least one container inspection station 32 to an outfeed station 34. Outfeed station 34 may deposit containers 30 in sequence onto a linear conveyor 36 for example. An exemplary outfeed station is illustrated in FIG. 24 of U.S. Pat. No. 6,581,751. Container inspection device 38 at station 32 may be of any suitable type. There preferably are a plurality of container inspection devices disposed around the periphery of conveyor 22, which preferably indexes the containers in sequence through the respective inspection stations. Each inspection station 32 preferably includes at least one inspection device 38.

Figure 3:
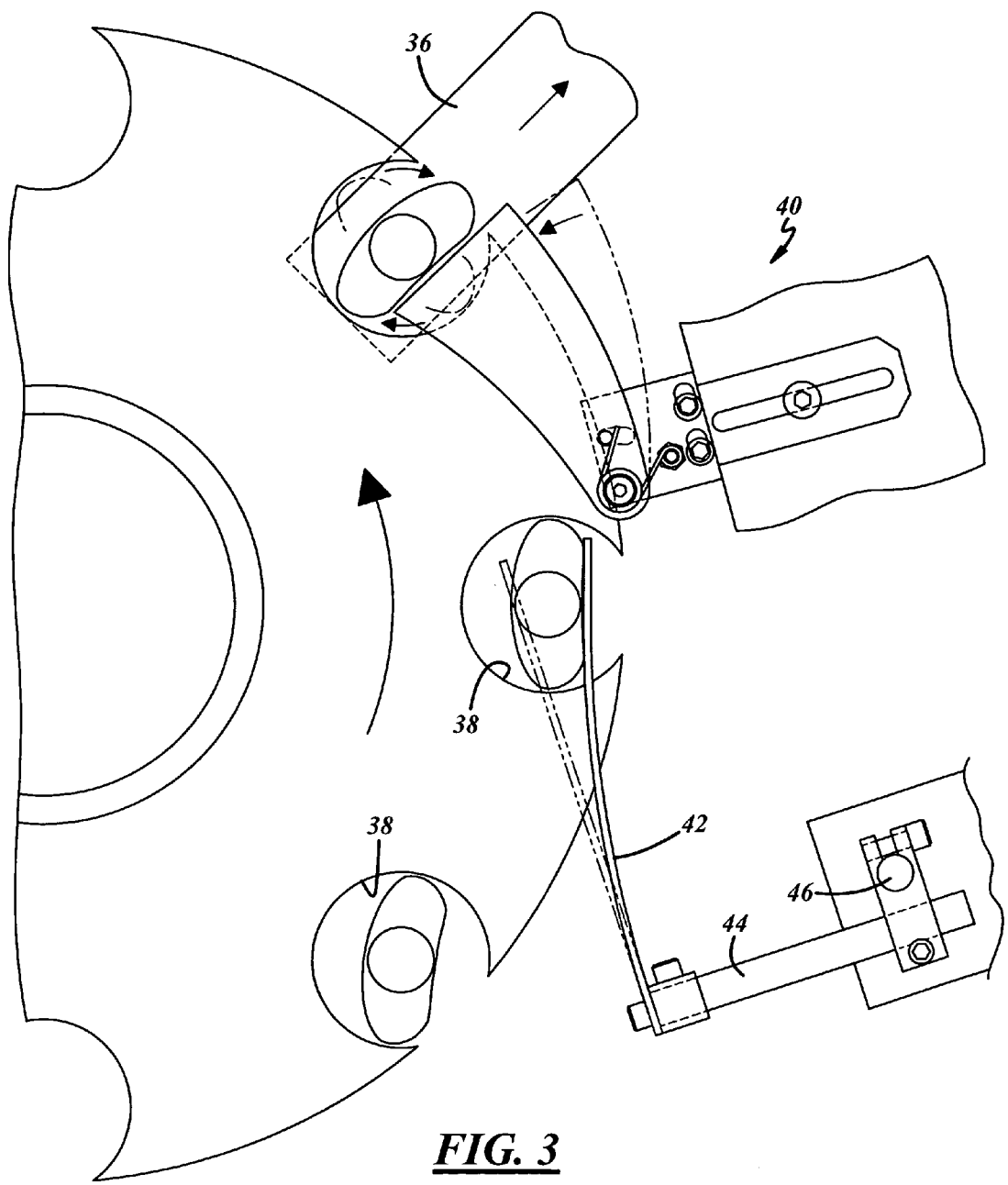

The present disclosure is presented in conjunction with inspection and orientation of flask-shaped containers 30 of the type having a long width dimension and a short width dimension. The long width dimension of container 30 is oriented vertically, by way of example, in the center of FIG. 1 and the short width dimension is oriented horizontally. An apparatus 40 is disposed adjacent to outfeed station 34, immediately upstream of the outfeed station with respect to the direction 41 of conveyance of sequential containers 30, to orient containers 30 at a predetermined orientation at outfeed station 34. Sequential containers 30 can be at random orientation approaching apparatus 40, and apparatus 40 orients the containers so that the long width dimension of each container is radial to axis 26 at outfeed station 34 (as shown in FIG. 3). Container orientation apparatus 40 includes a flexible resilient flap 42 carried by an arm 44 that extends from a post 46 supported on a base mounting structure 48. Flap 42 is disposed with respect to the periphery of conveyor 22 to engage containers 30 in sequence as the containers are transported past flap 42 to orient each container 30 so that the long width dimension of the container is tangential to conveyor axis 26, as illustrated in FIG. 1.

Figure 2:
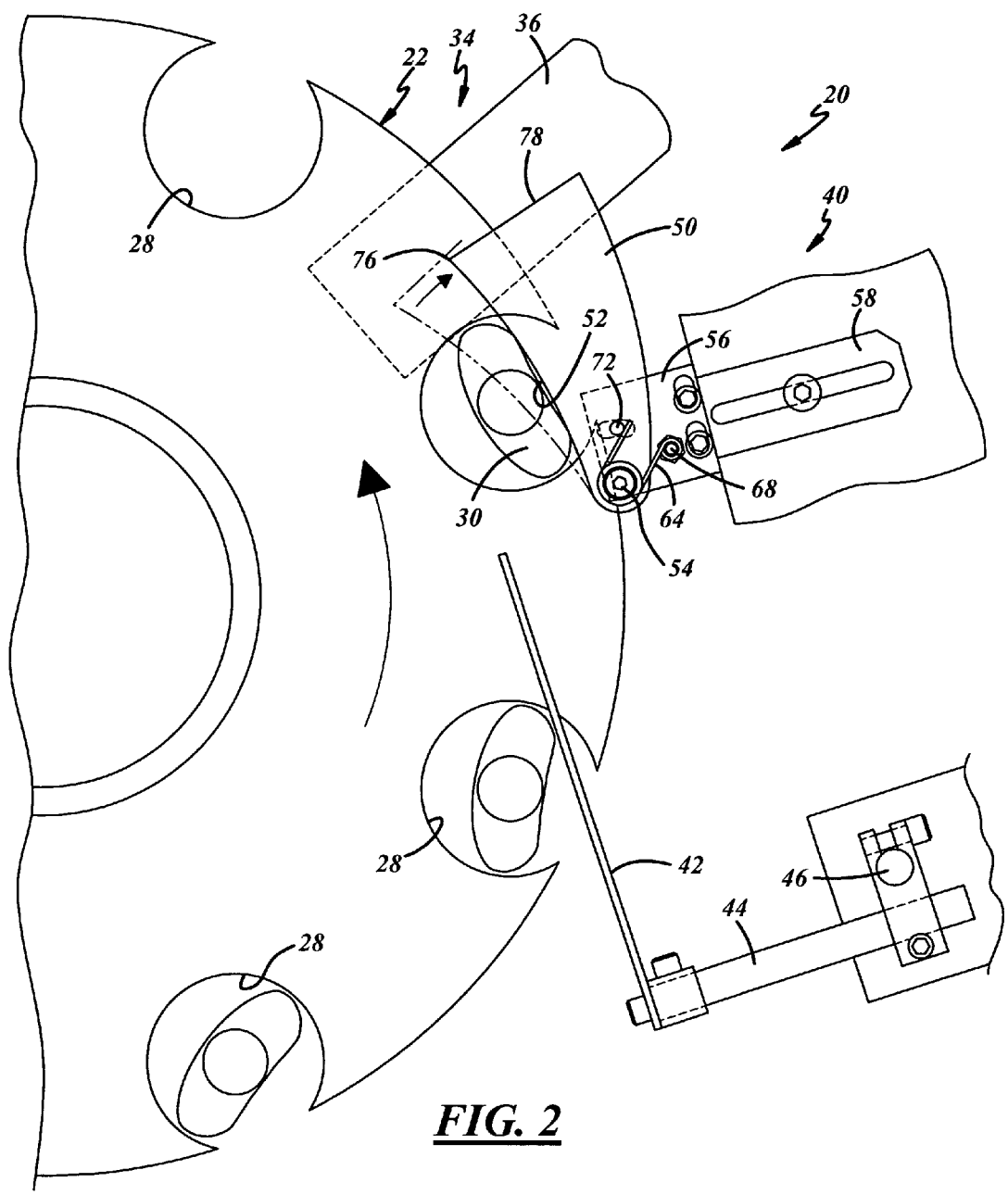
FIGS. 2 and 3 are fragmentary schematic plan views of the apparatus in FIG. 1 at sequential stages of operation.

Downstream of flap 42, a flipper arm 50 has a cam surface 52, preferably an arcuate concave cam surface, that is oriented radially inwardly toward conveyor axis 26. Flipper arm 52, in the exemplary embodiment of the disclosure, is pivotally mounted on a post 54 that is secured to a mounting plate 56. Mounting plate 56 has a laterally extending leg 58 with a slot 60 for adjustable mounting on a support structure 62 (which may be the same as support structure 48). A spring 64, preferably a coil spring, encircles post 54. One end 66 of spring 64 engages an abutment secured to plate 56, such as a screw 68. The opposing end 70 of spring 64 engages a pin 72 press-fitted into flipper arm 50. Pin 72 extends through an opening 74 in plate 56, preferably an arcuate slotted opening, to define limits of pivotal motion of flipper arm 50 between the fully inward position of FIGS. 1, 3 and 5, and an outer limit position. FIG. 2 illustrates flipper arm 50 at a position between the inner and outer limit positions. At the end of cam surface 52 remote from post 54, flipper arm 50 has an edge 76, preferably a relatively sharp edge as best seen in FIG. 5. An abutment surface 78 extends from edge 76, preferably a straight abutment surface that is substantially tangential to the pivot axis of flipper arm 50 around post 54. At the rest position of the flipper arm (FIGS. 1 and 3) edge 78 preferably is substantially parallel to the direction of motion of conveyor 36.

As container 30 approaches and initially engages flipper arm cam surface 52, with the long width dimension of the container oriented by flap 42 tangential to conveyor axis 26 as shown in FIG. 2, the container pivots flipper arm 50 outwardly against the force of spring 64. When the container is conveyed to a position at which the container is engaged by flipper arm edge 76, continued motion of the container moves the container out of engagement with flipper arm cam surface 52 so that the flipper arm moves radially inwardly under the force of spring 64. As the flipper arm moves radially inwardly, flipper arm edge 76 engages and rotates the container as illustrated in FIG. 3 until the container hits abutment surface 78 of flipper arm 50. At this position, the long width dimension of the container is now oriented radially of conveyor axis 26, which is to say that the long width dimension of the flask-shaped container extends in this direction of linear outfeed conveyor 36. In this orientation, the container can be deposited on conveyor 36 and transported away from rotary conveyor 22.

There thus have been disclosed an apparatus and method for orienting non-round containers, particularly flask-shaped containers, at the outfeed station of a rotary container inspection machine, which fully satisfies all of the objects and aims previously set forth. The disclosure has been presented in connection with an exemplary embodiment, and a number of modifications and variations have been discussed. Other modifications and variations readily will suggest themselves to persons of ordinary skill in the art in view of the foregoing description. The disclosure is intended to embrace all such modifications and variations as fall within the spirit and broad scope of the appended claims.

The invention claimed is:

1. Apparatus for controlling orientation of non-round containers at an outfeed station of a container inspection machine having a rotary conveyor with pockets in which the containers are individually disposed, said apparatus including:
   a flipper arm for disposition adjacent to the conveyor and mounted to pivot around an axis, a spring for biasing said flipper arm around said axis toward said conveyor,
   said flipper arm having a concave cam surface disposed to be engaged by a container carried by the conveyor as the container approaches the outfeed station to cam said flipper arm outwardly with respect to the conveyor and against said spring,
   said flipper arm having an edge at an end of said cam surface remote from said axis for engaging and rotating the container as the container moves out of engagement with said cam surface and said flipper arm moves inwardly under force of said spring,
   said flipper arm including a straight abutment surface extending from said edge.

2. The apparatus set forth in claim 1 including a flexible resilient flap for disposition adjacent to said conveyor upstream of said flipper arm with respect to motion of said conveyor for engaging a container and rotating the container to a predetermined orientation before engagement of the container with said flipper arm.

3. Apparatus for inspecting flask-shaped containers, which includes:
   a rotary conveyor having a conveyor axis and a plurality of peripheral pockets for conveying flask-shaped containers disposed in said pockets in sequence through at least one container inspection station toward an outfeed station,
   a flipper arm mounted to pivot around a post adjacent to a periphery of said conveyor and pivotal around a second axis parallel to said conveyor axis, said second axis being at an end of said flipper arm remote from said outfeed station, and
   a spring encircling said post and engaged with said flipper arm, said spring biasing said flipper arm toward said conveyor axis,
   said flipper arm having a concave cam surface facing said conveyor axis for engagement by containers in sequence to pivot said flipper arm around said second axis away from said conveyor axis,
   said cam surface having an edge spaced from said second axis for engaging and rotating the flask-shaped containers in said pockets in sequence, as the containers are conveyed out of engagement with said cam surface, to an orientation in which a long width dimension of each container is oriented radially of said conveyor axis,
   said post being mounted on a support plate having a slot, said flipper arm having a pin that extends through said slot, and said spring comprising a coil spring encircling said post and having one end engaged with said pin and a second end coupled to said plate,
   said flipper arm including straight abutment surface extending from said edge.

4. The apparatus set forth in claim 3 including a flexible resilient flap mounted adjacent to said conveyor on a side of said flipper arm remote from said outfeed conveyor, said flap being disposed to be engaged by containers in sequence carried by said conveyor to orient said containers such that said long width dimension is tangential to said conveyor axis.

5. A method of orienting a flask-shaped container having a long width dimension as the container is conveyed by a rotary conveyor, which includes the steps of:
   (a) initially orienting the container such that the long width dimension of the container is tangential to an axis of the conveyor, then (b) reorienting the container such that the long width dimension of the container is radial to the axis of the conveyor, and (c) depositing the container on an outfeed linear conveyor with the long width dimension of the container radial to the axis of the rotary conveyor and parallel to the longitudinal dimension of the linear conveyor.

* * * * *